US009996939B2

(12) United States Patent
Huang et al.

(10) Patent No.: US 9,996,939 B2
(45) Date of Patent: Jun. 12, 2018

(54) LARGE-RANGE-FIRST CROSS-CAMERA VISUAL TARGET RE-IDENTIFICATION METHOD

(71) Applicant: Institute of Automation Chinese Academy of Sciences, Beijing (CN)

(72) Inventors: Kaiqi Huang, Beijing (CN); Lijun Cao, Beijing (CN); Weihua Chen, Beijing (CN)

(73) Assignee: Institute of Automation Chinsese Academy of Sciences, Beijing (CN)

( * ) Notice: Subject to any disclaimer, the term of this patent is extended or adjusted under 35 U.S.C. 154(b) by 11 days.

(21) Appl. No.: 15/307,805

(22) PCT Filed: Apr. 30, 2014

(86) PCT No.: PCT/CN2014/076640
§ 371 (c)(1),
(2) Date: Jan. 9, 2017

(87) PCT Pub. No.: WO2015/165092
PCT Pub. Date: Nov. 5, 2015

(65) Prior Publication Data
US 2017/0116753 A1   Apr. 27, 2017

(51) Int. Cl.
*G06T 7/20* (2017.01)
*G06T 7/246* (2017.01)
(Continued)

(52) U.S. Cl.
CPC .......... *G06T 7/246* (2017.01); *G06K 9/00771* (2013.01); *G06K 9/4642* (2013.01);
(Continued)

(58) Field of Classification Search
CPC ......... G06T 7/246; G06T 7/215; G06T 7/277; G06K 9/00771; G06K 9/4642; G06K 9/4652; G06K 9/6212; G06K 9/6215
See application file for complete search history.

(56) References Cited

U.S. PATENT DOCUMENTS 6,940,545 B1 * 9/2005 Ray ..................... G06K 9/00228
348/207.99
7,148,913 B2 * 12/2006 Keaton ................ G06F 3/011
348/169
(Continued)

FOREIGN PATENT DOCUMENTS

CN       101277429       10/2008
CN       101854516       10/2010
(Continued)

*Primary Examiner* — Manav Seth
(74) *Attorney, Agent, or Firm* — Jeremy Howard

(57) ABSTRACT

The present invention relates to a large-range-first cross-camera visual target re-identification method. The method comprises: step S1, obtaining initial single-camera tracks of targets; step S2, calculating a piecewise major color spectrum histogram feature of each track, and obtaining a track feature representation; step S3, obtaining a calculation formula of the similarity between any two tracks by using a minimum uncertainty method, so as to obtain the similarity between any two tracks; and step S4, performing global data association on all the tracks by using a maximum posterior probability method, so as to obtain a cross-camera tracking result. The target re-identification method of the present invention achieves high correct identification accuracy.

11 Claims, 1 Drawing Sheet

(51) Int. Cl.
    *G06K 9/00*          (2006.01)
    *G06K 9/46*          (2006.01)
    *G06K 9/62*          (2006.01)
    *G06T 7/277*         (2017.01)
    *G06T 7/215*         (2017.01)

(52) U.S. Cl.
    CPC ......... *G06K 9/4652* (2013.01); *G06K 9/6212* (2013.01); *G06K 9/6215* (2013.01); *G06T 7/215* (2017.01); *G06T 7/277* (2017.01)

(56) References Cited

U.S. PATENT DOCUMENTS

| | | | |
|---|---|---|---|
| 7,242,421 B2 * | 7/2007 | Center, Jr. | H04N 7/147 348/14.1 |
| 7,558,762 B2 * | 7/2009 | Owechko | G06K 9/00369 396/427 |
| 7,623,676 B2 * | 11/2009 | Zhao | G06K 9/00369 348/580 |
| 7,932,923 B2 * | 4/2011 | Lipton | G06F 17/3079 348/143 |
| 7,940,959 B2 * | 5/2011 | Rubenstein | G06K 9/0063 348/143 |
| 8,098,891 B2 * | 1/2012 | Lv | G06T 7/292 348/143 |
| 2006/0170769 A1 * | 8/2006 | Zhou | G06K 9/00362 348/143 |
| 2008/0040179 A1 | 2/2008 | Masermann | |
| 2014/0201126 A1 * | 7/2014 | Zadeh | G06K 9/627 706/52 |
| 2014/0270540 A1 * | 9/2014 | Spector | G06T 7/60 382/199 |
| 2015/0339828 A1 * | 11/2015 | Djelouah | G06T 7/0087 382/173 |
| 2017/0024898 A1 * | 1/2017 | Spector | G06T 7/60 |

FOREIGN PATENT DOCUMENTS

| | | | |
|---|---|---|---|
| CN | 101854516 A | * | 10/2010 |
| CN | 102724773 | | 10/2012 |

\* cited by examiner

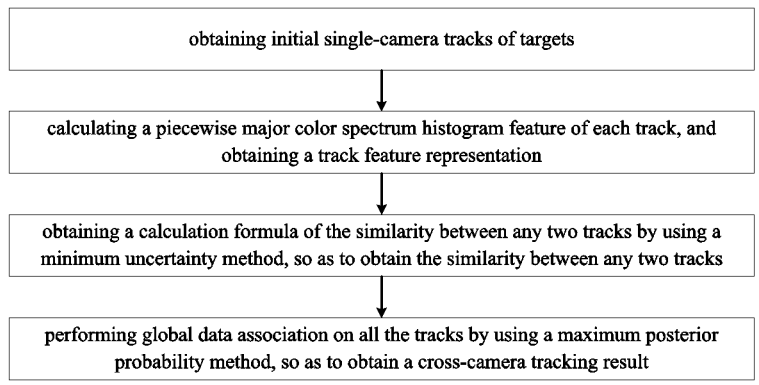

LARGE-RANGE-FIRST CROSS-CAMERA VISUAL TARGET RE-IDENTIFICATION METHOD

TECHNICAL FIELD

The present invention relates to the field of video monitoring and mode identification, in particular to a large-range-first cross-camera visual target re-identification method.

BACKGROUND OF THE INVENTION

With the rapid development of social modernization, social security has been more and more concerned, especially monitoring of some public places such as schools, hospitals, government offices, etc. Nowadays, thousands of cameras are used in daily monitoring of public places, and generate a lot of video data every day. However, the conventional video monitoring systems require human monitoring, so they have many insurmountable problems.

First of all, the videos should be monitored in real-time and cannot be automatically monitored and warned in the existing video monitoring systems, which causes the monitoring personnel to be over-fatigued because of the long-time monitoring. Meanwhile, owing to factors like monitoring range, multi-path monitoring is usually required to be performed and usually could not be attended at all, so an intelligent video monitoring system is necessary.

The core technology of the intelligent video monitoring system is the technology of visual target re-identification in a large-range monitoring scene, which has always been one of the research hotspots in the field of computer vision. Furthermore, visual target re-identification based on multi-camera target tracking has attracted many scholars' attention. The multi-camera target tracking can not only achieve monitoring and tracking of pedestrians in public places, but also provide more valuable information for further advanced processing (e.g. behavior recognition). A conventional multi-camera target tracking algorithm mainly includes two steps: the first step is to achieve a single-camera tracking of multiple targets in a single scene to obtain a complete single-camera track of each target in the scene; the second step is to achieve a cross-camera target tracking, namely a connection of cross-camera tracks is achieved by means of cross-camera time and space information, thereby achieving the target tracking. It can be seen from these two steps that the cross-camera target tracking is based on the single-camera target tracking, and the input thereof is from the result of the single-camera tracking. In other words, when the result of the single-camera tracking fails to meet a certain criterion, the effect of the cross-camera tracking will be badly influenced. In fact, the present single-camera target tracking algorithms will produce a lot of fractured and fragmented tracks and erroneous interference tracks in practical application, and they are not qualified for the cross-camera tracking. In this case, the effect of the cross-camera tracking algorithm cannot be guaranteed, which finally makes it difficult to achieve a multi-camera target tracking in actual scenes. The conventional cross-camera tracking algorithms are based on the assumption that the single-camera tracking effect is ideal enough to be used as the input for the algorithms, so they achieve a relative poor tracking effect in practical application. Therefore, it has become an urgent problem to solve that how to increase the accuracy of cross-camera tracking under the poor effect of single-camera target tracking so as to achieve a basic multi-camera target tracking and to achieve target re-identification.

SUMMARY OF THE INVENTION

The object of the present invention is to provide a large-range-first cross-camera visual target re-identification method to overcome the defect of the prior art, which can solve the problem concerning target re-identification in a large-range monitoring scene and achieves high identification accuracy.

To achieve the above-mentioned object, the present invention provides a large-range-first cross-camera visual target re-identification method, which comprises:

step S1: obtaining initial single-camera tracks of targets;

step S2: calculating a piecewise major color spectrum histogram feature of each track and obtaining a track feature representation;

step S3: obtaining a calculation formula for the similarity between any two tracks by using a minimum uncertainty method so as to obtain the similarity between any two tracks;

step S4: performing global data association on all the tracks by using a maximum posterior probability method to obtain a cross-camera tracking result.

Further, in said step S1, for each track, a mean value of the confidence of all frames is used to represent a track accuracy of the track:

$$c = \sum_{j=t_s}^{t_e} \alpha_j / (t_e - t_s) \quad (1)$$

wherein the confidence $\alpha$ represents the result of tracking of each frame, $\alpha<0.2$ means that the tracked target is lost, and $t_s$ and $t_e$ are respectively the start frame and end frame of the track; a finally formed set of tracks of all targets is $L=\{l_1, l_2, \ldots, l_N\}$, wherein N is a track sum, and each track $l_i=[x_i, c_i, s_i, t_i, \alpha_i]$ represents the position, accuracy, scene, time and apparent features of the track, respectively.

Further, said step S2 specifically includes: calculating color histograms of targets in each frame, then dividing the color space into 16*2 colors according to the values of H and S, and selecting the first n color values as the features of said targets in said frame:

$$h=\{C_1, C_2, \ldots, C_n\} \quad (2)$$

wherein $C_i$ is one of the first n colors whose sum of the pixel numbers accounts for above 90% of that of the total pixel numbers, and a general feature of each track is:

$$H=\Sigma_{i=1}^{m_k} h_i \quad (3)$$

wherein $m_k$ is the length of track k; for all features $h_i$ in the general feature H, calculating similarities therebetween as $\Lambda=\text{Sim}(h_i, h_j)$, and finding a movement period through information of similarities between each frame in the track, then re-segmenting the original track feature H according to the period, wherein the periodic information p that might exist in the general feature H is obtained by:

$$p = \underset{t}{\text{argmax}} \frac{1}{m_k - t} \sum_{j=1}^{m_k - t} \Lambda_{j, j+t} \quad (4)$$

and the track is re-segmented uniformly according to the periodic information p so as to obtain a piecewise major color spectrum histogram feature of the track:

$$H=\{H_1, H_2, \ldots, H_d\} \quad (5)$$

in which $d=\lceil m_k/p \rceil$ represents the number of segments into which the track is segmented.

Further, said step S3 specifically includes: calculating a similarity between two tracks to guide matching between the tracks, and maximizing the similarity while minimizing the uncertainty, so that the obtained similarity match value can reflect the real similarity relation between two tracks, wherein the matching formula is:

$$Dis(H^A, H^B) = 1 - \frac{\max Sim(H_i^A, H_j^B) - \min Sim(H_u^A, H_v^B)}{\max Sim(H_i^A, H_j^B) + \min Sim(H_u^A, H_v^B)} \quad (6)$$

in which $H^A$ and $H^B$ are piecewise major color spectrum histogram features of two tracks, and $H_i^A$ and $H_j^B$ are certain segments thereof, $i=\{1, 2, \ldots, d_A\}$, $j=\{1, 2, \ldots, d_B\}$.

Further, said step S4 specifically includes:

step S4-1: obtaining each globally associated track $T_i=\{l_{i_1}, l_{i_2}, \ldots, l_{i_k}\}$, and obtaining a general set of associated tracks $T=\{T_1, T_2, \ldots, T_m\}$, m being the number of associated tracks; then obtaining a maximum posterior probability of set T when a given set L of tracks and the associated tracks do not overlap:

$$T^* = \underset{T}{\mathrm{argmax}} \prod_i P(l_i \mid T) \prod_{T_k \in T} P(T_k) \quad (7)$$

$$T_i \cap T_j = \phi, \forall\, i \neq j$$

wherein $P(l_i|T)$ is the similarity of track $l_i$, and $P(T_k)$ is a possible priori probability of associated tracks, which can be represented by a Markov chain containing a transition probability $\Pi P(l_{k_{i+1}} | l_{k_i})$; step S4-2: building a graph structure, wherein each node represents a track $l_i$ and its value is $c_i$, and each edge represents a priori probability $P(l_i \to l_j)$; and obtaining a set that enables $T^*$ to be the maximum from the minimum cost function flow of the entire graph, wherein the cost energy $e_{ij}$ of each flow is represented by a negative logarithmic function as:

$$e_{ij} = -\log P(L \mid l_i \to l_j) P(l_i \to l_j) \quad (8)$$
$$= -\log(P_m * P_t * P_a)$$

in which $P_m$ and $P_t$ respectively represent match probabilities of motion information and time information between tracks, and $P_a$ represents the match probability of apparent features of tracks, whose match similarity formula is:

$$P_a = \begin{cases} Dis(H^A, H^B) & \text{if } s_i = s_j \\ \lambda Dis(H^A, H^B) & \text{if } s_i \neq s_j \end{cases} \quad (9)$$

and the cost energy of each flow is obtained, then a traversing is performed to finally obtain a set T that enables the posterior probability to be the maximum, which is the result of multi-camera target tracking and re-identification.

The cross-camera visual target re-identification method according to the present invention achieves high identification accuracy.

BRIEF DESCRIPTION OF THE DRAWING

FIG. 1 is a flow chart of the large-range-first cross-camera visual target re-identification method of the present invention.

DETAILED DESCRIPTION OF THE INVENTION

The technical solution of the present invention will be described in further detail below by means of the drawing and embodiments.

The effect of cross-camera target tracking largely depends on the result of single-camera tracking. The present invention relates to a target tracking and re-identification method based on global track association, which can obtain a relatively better cross-camera tracking result when the track of single-camera tracking is not good. Meanwhile, the present invention proposes a new track feature representation, which can achieve multi-camera target tracking and re-identification in non-overlapping scenes.

The present invention preferentially solves the problem of target re-identification in a large-range monitoring scene. The method achieves multi-camera visual target re-identification by means of a global optimization of all tracks of multiple cameras, and forms a complete target track. Matching between tracks is achieved by means of a minimum uncertainty method while using the piecewise major color spectrum histogram feature having periodicity as the track feature representation, thereby further increasing target re-identification accuracy.

FIG. 1 is a flow chart of the large-range-first cross-camera visual target re-identification method of the present invention. As shown in the FIGURE, the invention specifically includes the following steps:

Step 101: obtaining initial single-camera tracks of targets.

Specifically, an initial track of each pedestrian in each scene is obtained by means of pedestrian detection and single-target pedestrian tracking. The pedestrian detection method adopts pedestrian-based head and shoulder detection, while the single-target tracking algorithm employs an adaptive multi-feature association method. The confidence $\alpha$ represents the result of tracking of each frame, and $\alpha<0.2$ means that the tracked target is lost. For each track, a mean value of $\alpha$ of all frames is used to represent the track accuracy of said track:

$$c = \sum_{j=t_s}^{t_e} \alpha_j / (t_e - t_s) \quad (1)$$

wherein $t_s$ and $t_e$ are respectively the start frame and end frame of the track.

A finally formed set of tracks of all targets is $L=\{l_1, l_2, \ldots, l_N\}$, wherein N is the track sum, and each track $l_i=[x_i, c_i, s_i, t_i, \alpha_i]$ represents the position, accuracy, scene, time and apparent features of the track, respectively.

Step 102: calculating a piecewise major color spectrum histogram feature of each track to obtain a track feature representation;

for a MCSHR (Major Color Spectrum Histogram Representation) feature, firstly calculating HSV color histograms of targets of each frame, then dividing the color space into 16*2 colors according to the values of H and S, and selecting the first n color values as the MCSHR feature representations of said targets in said frame:

$$h = \{C_1, C_2, \ldots, C_n\} \quad (2)$$

wherein $C_i$ is one of the first n colors whose sum of the pixel numbers accounts for above 90% of that of the total pixel numbers, and then a required general MCSHR feature is obtained for each track:

$$H = \sum_{i=1}^{m_k} \quad (3)$$

wherein $m_k$ is the length of track k. Further, for all $h_i$ in H, calculating similarities therebetween as $\Lambda = Sim(h_i, h_j)$ by means of the method in the thesis. The steps of pedestrian during their movement are obviously periodic, so the idea herein is to find the period of such movement through information of similarities between each frame in the track. And the period is used to re-segment the original track feature H. Namely, the periodic information p that might exist in H is found through the formula:

$$p = \operatorname*{argmax}_{t} \frac{1}{m_k - t} \sum_{j=1}^{m_k - t} \Lambda_{j, j+t} \quad (4)$$

And the track is re-segmented uniformly according to p so as to obtain a piecewise major color spectrum histogram feature of the track:

$$H = \{H_1, H_2, \ldots, H_d\} \quad (5)$$

wherein $d = \lceil m_k/p \rceil$ represents the number of segments into which the track is segmented.

Step 103: obtaining a calculation formula for the similarity between any two tracks by using a minimum uncertainty method, thereby obtaining the similarity between any two tracks.

During tracks matching, uncertainty of similarity between two tracks is also very important to some extent; such uncertainty of similarity between two tracks is calculated to guide matching between the tracks, i.e. maximizing the similarity while minimizing the uncertainty, so that the obtained similarity match value can better reflect the real similarity relation between two tracks. The specific matching formula is:

$$Dis(H^A, H^B) = 1 - \frac{\max Sim(H_i^A, H_j^B) - \min Sim(H_u^A, H_v^B)}{\max Sim(H_i^A, H_j^B) + \min Sim(H_u^A, H_v^B)} \quad (6)$$

wherein $H^A$ and $H^B$ are piecewise major color spectrum histogram features of two tracks, and $H_i^A$ and $H_j^B$ are certain segments thereof, $i = \{1, 2, \ldots, d_A\}$, $j = \{1, 2, \ldots, d_B\}$.

Step 104: performing global data association on all the tracks by using a maximum posterior probability method to obtain a cross-camera tracking result.

After obtaining a set $L = \{l_1, l_2, \ldots, l_N\}$ of all tracks as well as properties of each track $l_i = [x_i, c_i, s_i, t_i, \alpha_i]$, global optimization is performed on all track data using the maximum posterior probability method.

Firstly, each globally associated track is represented as $T_i = \{l_{i_1}, l_{i_2}, \ldots, l_{i_k}\}$, therefore a general set of associated tracks is $T = \{T_1, T_2, \ldots, T_m\}$, m being the number of tracks after the association. The object is to calculate the maximum posterior probability of set T when the given set L of tracks and the associated tracks do not overlap:

$$T^* = \operatorname*{argmax}_{T} \prod_{i} P(l_i \mid T) \prod_{T_k \in T} P(T_k) \quad (7)$$

$$T_i \cap T_j = \phi, \forall i \neq j$$

wherein $P(l_i|T)$ is the similarity of track $l_i$ (i.e. the previous accuracy $c_i$), and $P(T_k)$ is a possible priori probability of associated tracks, which can be expressed by a Markov chain containing a transition probability $\Pi p(l_{k_{i+1}}|l_{k_i})$.

Then a graph structure is built, wherein each node represents a track $l_i$ and its value is $c_i$, and each edge represents a priori probability $P(l_i \rightarrow l_j)$. Therefore a set that enables T* to be the maximum is obtained by finding the minimum cost function flow in the entire graph, thus formula (7) is transformed into a problem of calculating the minimum cost function. The cost energy $e_{ij}$ of each flow is represented by a negative logarithmic function as:

$$e_{ij} = -\log P(L \mid l_i \rightarrow l_j) P(l_i \rightarrow l_j) \quad (8)$$

$$= -\log(P_m g P_t g P_a)$$

wherein $P_m$ and $P_t$ respectively represent match probabilities of motion information and time information between tracks, and as for the specific calculation, reference can be made to the minimum flow method (J. Liu, P. Can, R. T. Collins, and Y. Liu, "Tracking sports players with context-conditioned motion models", CVPR 2013). $P_a$ represents the match probability of apparent features of tracks, and the previously calculated piecewise major color spectrum histogram features are used as the apparent feature representations of the tracks. Meanwhile, in order to differentiate tracks from different scenes, an adjustment factor λ is introduced, which is made to be 2.5 herein. Thus the specific match similarity formula is:

$$P_a = \begin{cases} Dis(H^A, H^B) & \text{if } s_i = s_j \\ \lambda Dis(H^A, H^B) & \text{if } s_i \neq s_j \end{cases} \quad (9)$$

The method for calculating $Dis(H^A, H^B)$ is shown in formula (6). Thus by substituting formula (9) into formula (8), the cost energy of each flow can be calculated. A traversing is performed to finally obtain a set T that enables the posterior probability to be the maximum, which is just the wanted result of multi-camera target tracking and re-identification.

The present invention adopts the idea of single-camera track data association and extends it to multi-camera global track data association to deal with matching of tracks from the same scene or from different scenes differently. It simplifies the conventional two-step multi-target tracking method and achieves it in one data association process. By means of the minimum uncertainty method and the piecewise major color spectrum histogram feature, the target re-identification accuracy is increased.

The cross-camera visual target re-identification method according to the present invention can obtain a better tracking effect and achieve multi-camera visual target re-identification even if the effect of single-camera algorithm is not ideal. It is applicable to non-overlapping scenes. It uses new feature representations and the similarity calculation method to further increase accuracy of re-identification.

Those skilled in the art shall be aware that the exemplary units and algorithm steps described in conjunction with the embodiments disclosed herein can be achieved by electronic hardware, computer software or a combination thereof, and in order to clearly illustrate the interchangeability between the hardware and software, the exemplary components and steps have been generally described above in terms of the functions thereof. As for whether said functions should be achieved by hardware or by software, it depends on the specific application and restrictions of design of the technical solution. Those skilled in the art can use a different method for each specific application so as to achieve the described functions, but such implementation shall not be considered as going beyond the scope of the present invention.

The steps of method or algorithm described in conjunction with the embodiment disclosed herein can be carried out by hardware, software modules executed by a processor, or by a combination thereof. The software modules can be disposed in a random access memory (RAM), a memory, a read-only memory (ROM), an electrically-programmable ROM, an electrically erasable programmable ROM, a register, a hard disc, a removable disc, a CD-ROM or any other form of storage medium known in the art.

The above-described specific embodiment describes in detail the object, technical solution and advantageous effect of the present invention. But it shall be appreciated that all the above described are merely specific embodiments of the present invention, which do not intend to limit the protection scope of the invention. Any modification, equivalent substitution and improvement made under the spirit and principle of the present invention shall fall within the protection scope of the present invention.

What is claimed is:

1. A large-range-first cross-camera visual target re-identification method, characterized in that said method comprises:
   step S1: obtaining initial single-camera tracks of targets;
   step S2: calculating a piecewise major color spectrum histogram feature of each track and obtaining a track feature representation;
   step S3: obtaining a calculation formula for the similarity between any two tracks by using a minimum uncertainty method so as to obtain the similarity between any two tracks; and
   step S4: performing global data association on all the tracks by using a maximum posterior probability method to obtain a cross-camera tracking result.

2. The method according to claim 1, characterized in that in said step S1, for each track, a mean value of confidence of all frames is used to represent a track accuracy of the track: From here it is clear the claim is calculating specific characteristics of data and then utilizing specific methodology on particular characteristics of the tracks:

$$c = \sum_{j=t_s}^{t_e} \alpha_j / (t_e - t_s) \quad (1)$$

wherein the confidence α represents the result of tracking of each frame, α<0.2 means that the tracked target is lost, and $t_s$ and $t_e$ are respectively the start frame and end frame of the track;
a finally formed set of tracks of all targets is L={$l_1$, $l_2$, ..., $l_N$}, wherein N is a track summary, and each track $l_i$=[$x_i$, $c_i$, $s_i$, $t_i$, $a_i$] represents the position, accuracy, scene, time and apparent features of the track, respectively.

3. A large-range-first cross-camera visual target re-identification method, the method comprising:
   step S1: obtaining initial single-camera tracks of targets;
   step S2: calculating a piecewise major color spectrum histogram feature of each track and obtaining a track feature representation;
   step S3: obtaining a calculation formula for the similarity between any two tracks by using a minimum uncertainty method so as to obtain the similarity between any two tracks; and
   step S4: performing global data association on all the tracks by using a maximum posterior probability method to obtain a cross-camera tracking result,
   wherein step S2 includes calculating color histograms of targets of each frame, then dividing the color space into 16*2 colors according to the values of H and S, and selecting the first n color values as the features of said targets in said frame:

$$h=\{C_1, C_2, \ldots, C_n\} \quad (2)$$

wherein $C_i$ is one color of the first n colors whose sum of the pixel numbers accounts for above 90% of that of the total pixel numbers, and a general feature of each track is:

$$H=\sum_{i=1}^{m_k} h_i \quad (3)$$

wherein $m_k$ is the length of track k;
calculating similarities therebetween as Λ=Sim($h_i$,$h_j$) for all features $h_i$ in the general feature H, and finding a movement period through information of similarities between each frame in the track, then re-segmenting the original track feature H according to the period, wherein the periodic information p that might exist in the general feature H is obtained by:

$$p = \underset{t}{\arg\max} \frac{1}{m_k - t} \sum_{j=1}^{m_k - t} \Lambda_{j,j+t} \quad (4)$$

and the track is re-segmented uniformly according to the periodic information p so as to obtain a piecewise major color spectrum histogram feature of the track:

$$H=\{H_1, H_2, \ldots, H_d\} \quad (5)$$

in which d=⌈$m_k/p$⌉ represents the number of segments into which the track is segmented.

4. The method according to claim 3, characterized in that said step S3 specifically includes:
   calculating a similarity between two tracks to guide matching between the tracks, and maximizing the similarity while minimizing the uncertainty, so that the obtained similarity match value can reflect the real similarity relation between two tracks, wherein the matching formula is:

$$Dis(H^A, H^B) = 1 - \frac{\max Sim(H_i^A, H_j^B) - \min Sim(H_u^A, H_v^B)}{\max Sim(H_i^A, H_j^B) + \min Sim(H_u^A, H_v^B)} \quad (6)$$

in which $H^A$ and $H^B$ are piecewise major color spectrum histogram features of two tracks, and $H_i^A$ and $H_j^B$ are certain segments thereof, $i=\{1, 2, \ldots, d_A\}$, $j=\{1, 2, \ldots, d_B\}$.

5. The method according to claim 4, characterized in that said step S4 specifically includes:

step S4-1: obtaining each globally associated track $T=\{l_{i_1}, l_{i_2}, \ldots l_{i_k}\}$, and obtaining a general set of associated tracks $T=\{T_1, T_2, \ldots, T_m\}$, m being the number of associated tracks; then obtaining a maximum posterior probability of set T when a given set L of tracks and the associated tracks do not overlap:

$$T^* = \underset{T}{\mathrm{argmax}} \prod_i P(l_i | T) \prod_{T_k \in T} P(T_k) \quad (7)$$

$$T_i \cap T_j = \phi, \forall i \neq j$$

wherein $P(l_i/T)$ is the similarity of track $l_i$, and $P(T_k)$ is a possible priori probability of associated tracks, which can be represented by a Markov chain containing a transition probability $\Pi P(l_{k_{i+1}} | l_{k_i})$;

step S4-2: building a graph structure, wherein each node represents a track $l_i$ and its value is $c_i$, each edge represents a priori probability $P(l_i \rightarrow l_j)$, and obtaining a set that enables T* to be the maximum from the minimum cost function flow of the entire graph, wherein the cost energy $e_{ij}$ of each flow is represented by a negative logarithmic function as:

$$e_{ij} = -\log P(L | l_i \rightarrow l_j) P(l_i \rightarrow l_j) \quad (8)$$
$$= -\log(P_m * P_t * P_a)$$

in which $P_m$ and $P_t$ respectively represent match probabilities of motion information and time information between tracks, and $P_a$ represents the match probability of apparent features of tracks, whose matching similarity formula is:

$$P_a = \begin{cases} Dis(H^A, H^B) & \text{if } s_i = s_j \\ \lambda Dis(H^A, H^B) & \text{if } s_i \neq s_j \end{cases} \quad (9)$$

and the cost energy of each flow is obtained, then a traversing is performed to finally obtain a set T that enables the posterior probability to be the maximum, which is just the result of multi-camera target tracking and re-identification.

6. The method according to claim 1, wherein step S2 includes finding a movement period through information of similarities of an original track feature between each frame in the track, then re-segmenting the original track feature according to the period.

7. A non-transitory storage medium tangibly embodying a program of machine-readable instructions executable by a digital processing apparatus to perform a method, said method comprising:

step S1: obtaining initial single-camera tracks of targets;

step S2: calculating a piecewise major color spectrum histogram feature of each track and obtaining a track feature representation;

step S3: obtaining a calculation formula for the similarity between any two tracks by using a minimum uncertainty method so as to obtain the similarity between any two tracks; and step S4: performing global data association on all the tracks by using a maximum posterior probability method to obtain a cross-camera tracking result.

8. The non-transitory storage medium according to claim 7, characterized in that in said step S1, for each track, a mean value of confidence of all frames is used to represent a track accuracy of the track: From here it is clear the claim is calculating specific characteristics of data and then utilizing specific methodology on particular characteristics of the tracks:

$$c = \sum_{j=t_s}^{t_e} \alpha_j / (t_e - t_s) \quad (1)$$

wherein the confidence $\alpha$ represents the result of tracking of each frame, $\alpha<0.2$ means that the tracked target is lost, and $t_s$ and $t_e$ are respectively the start frame and end frame of the track;

a finally formed set of tracks of all targets is $L=\{l_1, l_2, \ldots, l_N\}$, wherein N is a track summary, and each track $l_i=[x_i, c_i, s_i, t_i, a_i]$ represents the position, accuracy, scene, time and apparent features of the track, respectively.

9. The non-transitory storage medium according to claim 8, characterized in that said step S2 specifically includes:

calculating color histograms of targets of each frame, then dividing the color space into 16*2 colors according to the values of H and S, and selecting the first n color values as the features of said targets in said frame:

$$h=\{C_1, C_2, \ldots, C_n\} \quad (2)$$

wherein $C_i$ is one color of the first n colors whose sum of the pixel numbers accounts for above 90% of that of the total pixel numbers, and a general feature of each track is:

$$H = \sum_{i=1}^{m_k} h_i \quad (3)$$

wherein $m_k$ is the length of track k;

calculating similarities therebetween as $\Lambda = Sim(h_i, h_j)$ for all features $h_i$ in the general feature H, and finding a movement period through information of similarities between each frame in the track, then re-segmenting the original track feature H according to the period, wherein the periodic information p that might exist in the general feature H is obtained by:

$$p = \underset{t}{\mathrm{argmax}} \frac{1}{m_k - t} \sum_{j=1}^{m_k - t} \Lambda_{j, j+t} \quad (4)$$

and the track is re-segmented uniformly according to the periodic information p so as to obtain a piecewise major color spectrum histogram feature of the track:

$$H = \{H_1, H_2, \ldots, H_d\} \quad (5)$$

in which $d = \lceil m_k/p \rceil$ represents the number of segments into which the track is segmented.

10. The non-transitory storage medium according to claim 9, characterized in that said step S3 specifically includes:
calculating a similarity between two tracks to guide matching between the tracks, and maximizing the similarity while minimizing the uncertainty, so that the obtained similarity match value can reflect the real similarity relation between two tracks, wherein the matching formula is:

$$Dis(H^A, H^B) = 1 - \frac{\max Sim(H_i^A, H_j^B) - \min Sim(H_u^A, H_v^B)}{\max Sim(H_i^A, H_j^B) + \min Sim(H_u^A, H_v^B)} \quad (6)$$

in which $H^A$ and $H^B$ are piecewise major color spectrum histogram features of two tracks, and $H_i^A$ and $H_j^B$ are certain segments thereof, $i=\{1, 2, \ldots, d_A\}$, $j=\{1, 2, \ldots, d_B\}$.

11. The non-transitory storage medium according to claim 10, characterized in that said step S4 specifically includes:
step S4-1: obtaining each globally associated track $T_i = \{l_{i_1}, l_{i_2}, \ldots, l_{i_k}\}$, and obtaining a general set of associated tracks $T = \{T_1, T_2, \ldots, T_m\}$, m being the number of associated tracks; then obtaining a maximum posterior probability of set T when a given set L of tracks and the associated tracks do not overlap:

$$T^* = \underset{T}{\operatorname{argmax}} \prod_i P(l_i \mid T) \prod_{T_k \in T} P(T_k) \quad (7)$$

$$T_i \cap T_j = \phi, \forall\, i \neq j$$

wherein $P(l_i|T)$ is the similarity of track $l_i$, and $P(T_k)$ is a possible priori probability of associated tracks, which can be represented by a Markov chain containing a transition probability $\sqrt{P(l_{k_{j+1}} | l_{k_j})}$;

step S4-2: building a graph structure, wherein each node represents a track $l_i$ and its value is $c_i$, each edge represents a priori probability $P(l_i \rightarrow l_j)$, and obtaining a set that enables T* to be the maximum from the minimum cost function flow of the entire graph, wherein the cost energy $e_{ij}$ of each flow is represented by a negative logarithmic function as:

$$e_{ij} = -\log P(L \mid l_i \rightarrow l_j) P(l_i \rightarrow l_j) \quad (8)$$
$$= -\log(P_m * P_t * P_a)$$

in which $P_m$ and $P_t$ respectively represent match probabilities of motion information and time information between tracks, and $P_a$ represents the match probability of apparent features of tracks, whose matching similarity formula is:

$$P_a = \begin{cases} Dis(H^A, H^B) & \text{if } s_i = s_j \\ \lambda Dis(H^A, H^B) & \text{if } s_i \neq s_j \end{cases} \quad (9)$$

and the cost energy of each flow is obtained, then a traversing is performed to finally obtain a set T that enables the posterior probability to be the maximum, which is just the result of multi-camera target tracking and re-identification.

\* \* \* \* \*

UNITED STATES PATENT AND TRADEMARK OFFICE
CERTIFICATE OF CORRECTION

PATENT NO. : 9,996,939 B2
APPLICATION NO. : 15/307805
DATED : June 12, 2018
INVENTOR(S) : Huang et al.

It is certified that error appears in the above-identified patent and that said Letters Patent is hereby corrected as shown below:

On the Title Page

Item (72), Inventors:
On line three after (CN), add the following:
Yunfeng Kang, Beijing (CN)

Signed and Sealed this
Nineteenth Day of February, 2019

Andrei Iancu
*Director of the United States Patent and Trademark Office*